United States Patent
Matsuda

(10) Patent No.: US 9,160,214 B2
(45) Date of Patent: Oct. 13, 2015

(54) COOLING STRUCTURE FOR ELECTRIC VEHICLE

(75) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 365 days.

(21) Appl. No.: 13/884,255

(22) PCT Filed: Nov. 12, 2010

(86) PCT No.: PCT/JP2010/006646
§ 371 (c)(1),
(2), (4) Date: Jul. 3, 2013

(87) PCT Pub. No.: WO2012/063291
PCT Pub. Date: May 18, 2012

(65) Prior Publication Data
US 2013/0270938 A1    Oct. 17, 2013

(51) Int. Cl.
*H02K 9/00* (2006.01)
*H02K 9/19* (2006.01)
(Continued)

(52) U.S. Cl.
CPC .. *H02K 9/19* (2013.01); *B60K 1/00* (2013.01);
*B60K 1/02* (2013.01); *B60K 1/04* (2013.01);
*B60K 11/02* (2013.01); *B60K 11/04* (2013.01);
*B60L 1/003* (2013.01); *B60L 3/003* (2013.01);
*B60L 3/0061* (2013.01); *B60L 7/14* (2013.01);
(Continued)

(58) Field of Classification Search
CPC .................................. H02K 9/19; H02K 9/18

USPC .......... 310/51, 52, 53, 54, 55, 56, 57, 58, 59, 310/60 R, 61, 62, 63, 64
See application file for complete search history.

(56) References Cited

U.S. PATENT DOCUMENTS

| 5,372,213 A | 12/1994 | Hasebe et al. |
| 2006/0038522 A1* | 2/2006 | Iwashita et al. ............... 318/592 |

(Continued)

FOREIGN PATENT DOCUMENTS

| JP | 04224490 A | 8/1992 |
| JP | 05169985 A | 7/1993 |

(Continued)

OTHER PUBLICATIONS

ISA Japan, International Search Report of PCT/JP2010/006646, Feb. 8, 2011, WIPO, 2 pages.

(Continued)

*Primary Examiner* — Hanh Nguyen
(74) *Attorney, Agent, or Firm* — Alleman Hall McCoy Russell & Tuttle LLP

(57) ABSTRACT

Provided is an electric motorcycle including a traveling motor, and a power supply circuit of an inverter and the like, in which a non-conducting cooling oil is supplied to be brought into direct contact with at least one of an electromagnetic coil of the traveling motor and a circuit board of the inverter. A radiator is disposed outside cases of a power plant and a power control controller so as to allow a traveling wind to pass by. Cooling oil is circulated between the radiator and a case of at least one of the power plant and power control controller. A cooling structure for an electric motor and the like that can obtain a higher cooling efficiency than a conventional art while having a simple structure which hardly causes increases in size, weight, cost, and the like can be provided.

11 Claims, 10 Drawing Sheets

(51) Int. Cl.
| | |
|---|---|
| B60K 1/00 | (2006.01) |
| B60K 1/02 | (2006.01) |
| B60K 1/04 | (2006.01) |
| B60K 11/02 | (2006.01) |
| B60K 11/04 | (2006.01) |
| B62K 11/04 | (2006.01) |
| H02K 7/116 | (2006.01) |
| H02K 11/04 | (2006.01) |
| B60L 1/00 | (2006.01) |
| B60L 3/00 | (2006.01) |
| B60L 7/14 | (2006.01) |
| B60L 11/18 | (2006.01) |
| B60L 15/20 | (2006.01) |

(52) U.S. Cl.
CPC ......... *B60L 11/1803* (2013.01); *B60L 11/1864* (2013.01); *B60L 11/1874* (2013.01); *B60L 11/1877* (2013.01); *B60L 15/2009* (2013.01); *B60L 15/2054* (2013.01); *B62K 11/04* (2013.01); *H02K 7/116* (2013.01); *H02K 11/048* (2013.01); *B60K 2001/006* (2013.01); *B60L 2200/12* (2013.01); *B60L 2220/50* (2013.01); *B60L 2240/12* (2013.01); *B60L 2240/36* (2013.01); *B60L 2240/421* (2013.01); *B60L 2240/425* (2013.01); *B60L 2240/486* (2013.01); *B60L 2240/525* (2013.01); *B60L 2240/545* (2013.01); *B60Y 2200/12* (2013.01); *B62K 2204/00* (2013.01); *B62K 2208/00* (2013.01); *Y02T 10/641* (2013.01)

(56) References Cited

U.S. PATENT DOCUMENTS

| | | | |
|---|---|---|---|
| 2009/0121562 A1* | 5/2009 | Yim | 310/54 |
| 2012/0103716 A1* | 5/2012 | Fujihara et al. | 180/220 |
| 2012/0200179 A1* | 8/2012 | Matsumoto | 310/43 |

FOREIGN PATENT DOCUMENTS

| | | |
|---|---|---|
| JP | 2006197772 A | 7/2006 |
| JP | 2007157364 A | 6/2007 |
| JP | 2007166803 A | 6/2007 |
| JP | 2008092727 A | 4/2008 |
| JP | 2008151672 A | 7/2008 |
| JP | 2008295192 A | 12/2008 |
| JP | 2009071923 A | 4/2009 |
| JP | 2009273285 A | 11/2009 |

OTHER PUBLICATIONS

State Intellectual Property Office of China, Office action with search report of Chinese Patent Application No. CN2010800695316, Dec. 29, 2014, 12 pages.

* cited by examiner

COOLING STRUCTURE FOR ELECTRIC VEHICLE

TECHNICAL FIELD

The present invention relates to a cooling structure for a motor and a power supply circuit in an electric vehicle such as an electric car, an electric motorcycle, or a hybrid car.

BACKGROUND ART

In recent years, from the prospect of depletion of oil resources in the future with a growing interest in the environment, it is more highly demanded than before to reduce fuel consumption in an automobile and a motorcycle, etc. On the other hand, there has been fast progress in the research and development of secondary cells represented by a lithium ion cell, and attempts to use electricity as a power source for driving the electric car or hybrid become popular.

Generally an electric motor has quite high energy efficiency compared with an internal-combustion engine, but it generates heat during its operation. A leading cause of the heat is generation of heat from a coil attributable to resistance of electrical currents flowing in windings (so-called copper loss). This causes a rise in the temperature of the coil, increasing the electrical resistance of the windings and lowering efficiency. The increased electrical resistance leads to generation of the heat again, falling in a vicious cycle of the generation of heat, the rise in temperature, and the increase in electrical resistance. This becomes an obstacle to improving output of a motor.

In addition, the generation of heat from an inverter (power supply circuit) for supplying electric power to an electric motor has also been a problem. Since a high voltage is applied to switching elements of the inverter and converter as well as to the coil of an electric motor, a large current flows also there. For this reason, it is required to efficiently deprive of the generated heat to cool these components.

For this reason, from the past, various cooling structures have been proposed to effectively cool the electric motor and inverter in an electric vehicle. For example, Patent Document 1 discloses the technology which water-cools a case of a motor and directly cools an exothermic portion of the motor using cooling oil, such as ATF, stored in the case. According to this technology, a coil wound around a core portion of a stator is resin-molded and an oil path for the cooling oil is provided near a coil end which is especially easy to rise to a high temperature.

A portion of windings of the coil end is exposed to this oil path, so that it is effectively cooled by the cooling oil. By supplying the cooling oil pumped up by a pump or the like to the oil path from above and squeezing out the cooling oil discharged from an outlet of a lower end of the oil path by shaping the outlet like an orifice, the whole oil path becomes filled with the cooling oil and the windings of the coil are immersed.

In addition, according to the cooling structure disclosed in Patent Document 2, a housing of a motor unit is cooled by a coolant (LLC), a storage part for an inverter and a smoothing capacitor as well as a storage part for an electric motor are provided in the housing, and a module of the inverter and capacitor accommodated in the accommodating portion is brought into contact with a metal-based cooler in which a coolant flows.

In addition, for example, Patent Document 3 discloses the motor configured such that a cooling oil, such as ATF and gear oil, is sprayed at an coil end of a stator so that the coil end can be cooled. According to this configuration, the cooling oil is sprayed onto the coil end of the stator in a manner that the cooling oil is first introduced into a hollow portion formed near an end plate of a rotor via an oil path in a shaft, and then the cooling oil is ejected from an ejection hole communicating with the hollow portion by a centrifugal force generated by revolution of the rotor.

PRIOR ART DOCUMENTS

Patent Documents

Patent Document 1: Japanese Patent Application Laid-open Publication No. 2006-197772
Patent Document 2: Japanese Patent Application Laid-Open Publication No, 2008-151672
Patent Document 3: Japanese Patent Application Laid-Open Publication No. 2009-273285

SUMMARY OF THE INVENTION

Problems to be Solved by the Invention

However, in Patent Documents 1 and 3, cooling of the motor is performed by the cooling oil which is circulated through the inside of the case, and it is no more than a mechanism that the cooling oil simply delivers the heat of the motor to the case. Since the case itself is cooled by, for example, LLC like in Patent Document 2, two kinds of coolants such as a cooling oil (for example, ATF) and LLC are needed as the coolant. This makes the structure complicated, not only leading to increases in size and weight but also to a cost rise and tedious maintenance.

Furthermore, cooling the case with only LLC like in Patent Document 2 is not sufficient in efficiency. This is because the coil end, of which heat ma cause a problem in constitution of the motor is not in sufficient contact with the case and thus an air gap with comparatively considerable thermal resistance exists between the coil end and the case.

Yet furthermore, the structure of Patent Document 2 still has room for an improvement even in terms of cooling the inverter, etc. That is, in Patent Document 2, when the module of the inverter and the like is brought into contact with a cooler, practically an adhesive layer intervenes between the module and the cooler, hindering thermal conduction.

Accordingly, an object of the present invention is to provide a cooling structure for an electric motor etc, with which a far higher cooling efficiency can be acquired than before, while still having a simplified structure which hardly causes increases in size, weight, cost, and the like.

Solutions to the Problems

A subject matter of the present invention is a cooling structure for an electric vehicle including an electric motor for traveling and a power supply circuit for supplying electric power to the electric motor, the cooling structure comprising:

a coolant supplier that supplies a non-conducting coolant such that the non-conducting coolant comes into direct contact with at least one of an electromagnetic coil of the electric motor and a substrate of the power supply circuit;

a heat exchanger that is disposed outside cases of the electric motor and power supply circuit, and is provided so as to allow a traveling wind to pass through the heat exchanger; and a circulation fluid path which circulates the coolant between the case of at least one of the electric motor and the power supply circuit, and the heat exchanger.

With this configuration, the coolant which has heat-exchanged with the traveling wind in the heat exchanger is introduced into the case of the electric motor or power supply circuit and the coolant may be brought into direct contact with the electromagnetic coil or circuit board which is easy to rise to a high temperature, so that as high cooling efficiency as possible can be obtained. Two kinds of coolants are not necessarily used unlike the conventional art, and size, weight, cost, etc. are not likely to be increased. When a non-conducting cooling oil, for example, oil with a high insulation is used as the coolant, electric insulation in the electromagnetic coil or circuit board is securable.

The coolant supplier may be specifically configured to eject the coolant toward the electromagnetic coil of the stator fixed to the case of the electric motor. It is effective to spray the coolant especially onto the coil end which is especially easy to rise to a high temperature. At this point, when a position of the ejection hole, an ejection direction, an ejection amount, an ejection pressure, etc, are adequately set in such a manner that the coolant may not invade a gap between a rotor and the stator, there is a little risk of a revolution resistance increasing.

In this case, it is preferable that the coolant supplier includes a variable-speed electric pump. This is because a discharge amount of the coolant increases as a temperature of the electric motor rises, and, as a result, required sufficient cooling can be performed. The temperature of the electric motor may be measured by a sensor or may be estimated, for example, from a motor current value, etc.

On the other hand, when taking a cost into consideration, a coolant feeder may be equipped with a mechanical pump which is mechanically connected to a traveling motor of an electric vehicle. With this configuration, the discharge amount of the coolant increases as a revolution speed of the motor increases, and cooling which is adaptively performed according to a temperature state of the electric motor can be obtained as a result.

Furthermore, a gear-type driving-force transmission mechanism which transmits torque of the electric motor may be accommodated in the case of the electric motor so that the coolant is used for lubrication. When the revolution of the electric motor is slowed down by the gear-type driving-force transmission mechanism and then output, a torque load to the electric motor decreases, so that generation of heat can be suppressed.

In addition, the coolant supplier may not be limited to a component for cooling the electric motor, but be a component for cooling the circuit board accommodated in the case of the power supply circuit. When this is the case, the coolant supplier may include a fluid path configured such that at least a portion of the circuit board can be immersed in the coolant. For example, the cooling fin provided in the circuit board may be immersed in the coolant. In this case, a very high cooling effect may be expected.

When both of the electric motor and power supply circuit are directly cooled by the coolant as described above, in order to fully cool the power supply circuit, the case of the power supply circuit may be disposed such that the circulation fluid path for the coolant may first receive the coolant from the heat exchanger, and the case of the electric motor may be disposed such that the circulation fluid path then receives the coolant from the case of the power supply circuit.

Furthermore, when the vehicle is an electric motorcycle, the heat exchanger may be disposed behind a pair of front forks that support a front wheel so as to be elongated in a vertical direction and to be interposed between the pair of front forks when viewed from the front of a body of the vehicle, a plurality of batteries may be divided and separately disposed on left and right sides, in a rear side of the heat exchanger, and a vertically elongated traveling wind passage may be formed between the left side and right side batteries when viewed from the front of a body of the vehicle. With this configuration, a flow rate of the traveling wind to the heat exchanger is easily securable.

In this way, when the plurality of batteries is separately disposed on the left and right sides, an electric wire that connects connection terminals of the batteries may be disposed in the traveling wind passage between the left side and right side batteries. With this configuration, not only the batteries are effectively cooled by the traveling wind but also the electric wire and the connected connection terminals may be also effectively cooled. Furthermore, since the connection terminals and electric wire to which a high voltage is applied are located inside the body of the vehicle while being interposed between the left side and right side batteries, this configuration is also advantageous in terms of securing safety.

Effects of the Invention

According to the cooling structure for an electric vehicle according to the present invention, the coolant is directly applied to the traveling electric motor and power supply circuit which are easy to rise to a high temperature. And the coolant which has deprived the traveling electric motor and power supply circuit of heat is circulated between the cooling site and the heat exchanger so that the coolant will heat-exchange with the traveling wind. For this reason, as high cooling effect as possible may be expected, the structure is simple, and increases in size, weight, cost, etc are scarcely anticipated.

EMBODIMENTS OF THE INVENTION

Hereinafter, embodiments of the present invention will be described with reference to the accompanying drawings. And throughout the following description, directions are referenced from a perspective of a rider mounting an electric motorcycle, seated on the rider's seat and facing forward.

First Embodiment

Figure 1:
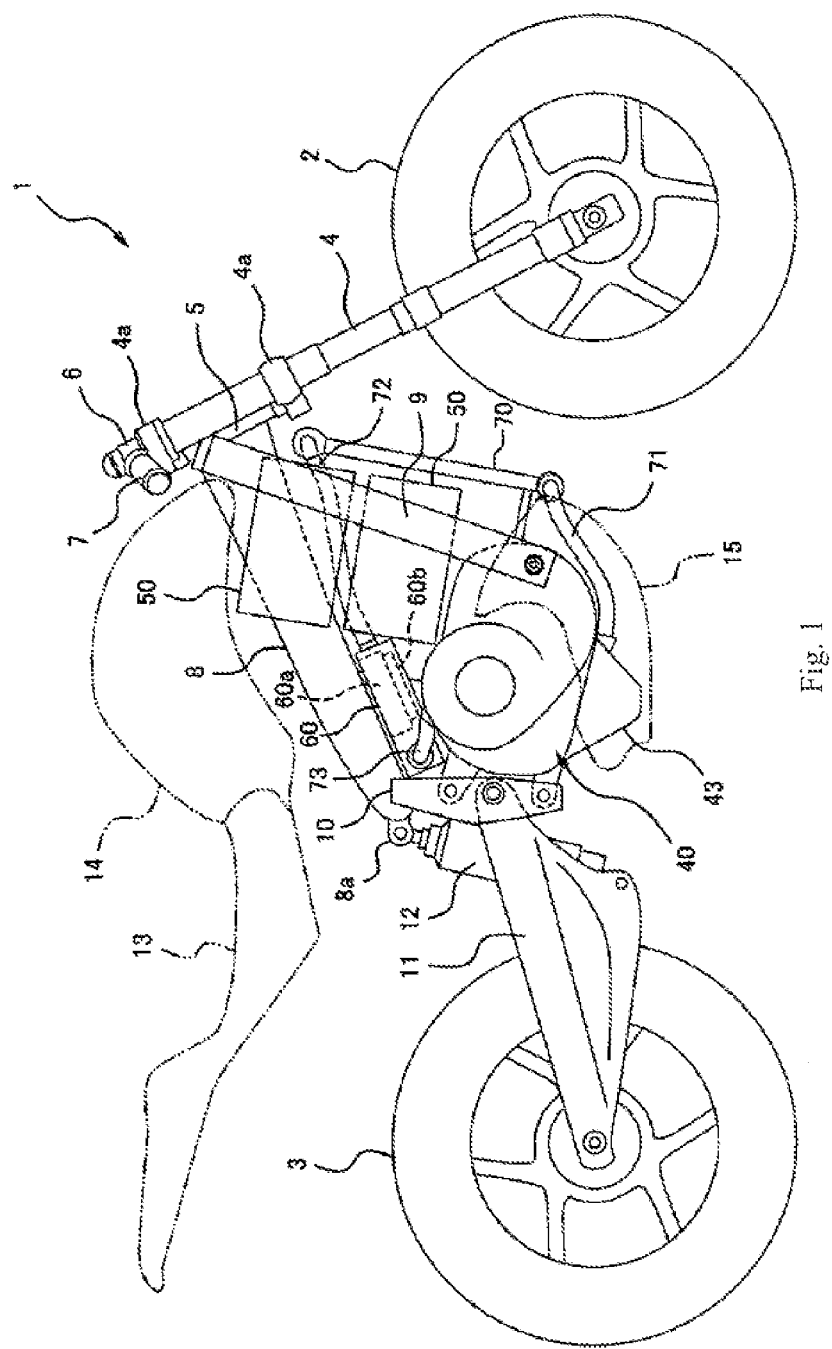
FIG. 1 is a right side view illustrating main parts, such as a power plant, of an electronic motorcycle according to a first embodiment of the present invention.
Figure 2:
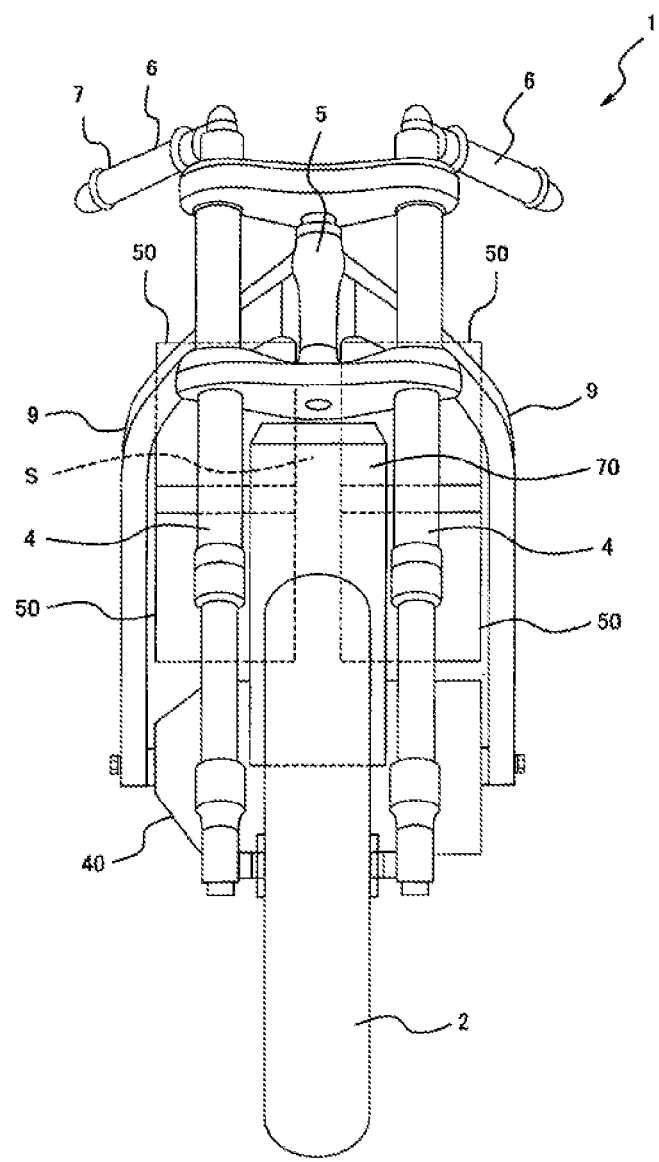
FIG. 2 is a front view of the same electronic motorcycle viewed from the front.

FIG. 1 is a right side view illustrating the main parts, such as a body frame, a power plant, and wheels, of an electric motorcycle 1 (electric vehicle) according to a first embodiment of the present invention, and FIG. 2 is a front view illustrating the same viewed from the front. As illustrated in FIG. 1, the electric motorcycle 1 includes a front wheel 2 as a steering wheel and a rear wheel 3 as a driving wheel. The front wheel 2 is freely rotatably supported by lower end portions of a pair of left and right front forks 4 which almost vertically extend. On the other hand, upper portions of the front forks 4 are supported by a steering shaft (not illustrated) via a pair of upper and lower brackets 4a.

The steering shaft is freely rotatably supported by a head pipe 5 in a state of being inserted in the head pipe 5 of the body side, and constitutes a steering shaft. A bar-type handle 6, which extends rightward and leftward like a bar, is attached to the upper bracket 4a, and the rider can achieve steering by turning the front fork 4 and the front wheel 2 around the steering shaft with the handle 6. A right end of the handle 6 is gripped by the rider's right hand, and provided with an accelerator grip 7 which is rotatable by a twist of the rider's wrist.

The body frame of the electric motorcycle 1 includes, for example, a main frame 8 which extends rearward and slightly inclines downward from the head pipe 5. For example, this includes a pipe member with a polygonal sectional shape which is an extrusion-molded product of an aluminum alloy, and a front end portion of this pipe member is welded to the head pipe 5. Upper end portions of a pair of left and right down frames 9 which extend downward are also welded to a position near the above-mentioned welding area, and, as illustrated in FIG. 2, these down frames 9 extend obliquely downward from the head pipe 5 while becoming rightward and leftward farther from each other toward lower portions thereof until a distance between them reaches a predetermined value, and then further extend downward with a constant distance between them.

On the other hand, a portion of an upper frame part of a pivot frame 10 having, for example, a rectangular frame shape is welded to a rear end portion of the main frame 8 such that the upper frame part extends rightward and leftward in perpendicular to the rear end portion of the main frame 8. A rear portion of a case of a power plant 40, details of which are described below, is fastened to the pivot frame 10, and a front portion of the case is fastened to a lower end portion of the down frame 9. That is, according to the present embodiment, a lower portion of the body frame is constituted by the case of the power plant 40.

A front end portion of a swing arm 11 which supports the rear wheel 3 is supported between a left frame part and a right frame part of the pivot frame 10 so as to be pivotable in a vertical direction, and the swing arm 11 extends rearward, slightly inclining downward, from a swinging pivot (pivot shaft). In the example of the drawing, a rear side portion of the swing arm 11 is bifurcated into two branches and the rear wheel 3 is supported rotatably between the two branches. On the other hand, a bulging portion which bulges downward is formed in a front side of the swing arm 11, thereby supporting a lower end portion of a damper 12. An upper end portion of the damper 12 is supported on an extension portion 8a formed at a rear end of the main frame 8, and the damper 12 expands and contracts with the vertical pivoting motion of the swing arm 11.

As illustrated by an imaginary line in the drawing, a rider's seat 13 is disposed above the swing arm 11, and a dummy tank 14 is disposed in front of the rider's seat 13. These are supported by a rear frame (not illustrated) which is connected to the main frame 8. In the case of an electric motorcycle, a fuel tank is unnecessary, but the dummy tank 14 is useful because a rider, seating in a horse-riding posture, would insert it between rider's knees and the inside of the dummy tank 14 may be used as the space for accommodating a helmet, for example. In addition, as illustrated by an imaginary line in similarly manner, an under guard 15 made of resin is disposed under the power plant 40.

In a space, between the front wheel 2 and the rear wheel 3, in which an engine, a transmission, a throttle device, etc. are likely to be disposed if it is in the case of a conventional electric motorcycle, the power plant 40 equipped with a traveling motor 20 and a transmission device 30 (refer to FIG. 3), a battery 50 for supplying electric power to the traveling motor 20, and a power control controller 60 are disposed.

In the example illustrated in the drawing, the power plant 40 is connected between the lower end portion of the down frame 9 and the lower portion of the pivot frame 10. Within a space above the power plant 40, four batteries 50 are disposed in a relatively front position and the power control controller 60 is disposed in a relatively rear position. For example, the four batteries 50 are symmetrically mounted with respect to the main frame 8, two on the left side and two on the right side. As illustrated by a dashed line in FIG. 2, a vertically elongated space S is formed between the left side and right side batteries 50. Although not illustrated in the drawing, an electric wire that connects connection terminals of the left side and right side batteries 50 and a power supply line which is connected from the batteries 50 to the power plant 40 via the power control controller 60 are disposed in the space S.

Here, the traveling motor 20 is a motor/generator which performs a motor operation and a power generation operation, and drives the rear wheel 3 by performing the motor operation with the electric power supplied from the batteries 50 via the power control controller 60. On the other hand, the traveling motor 20 operates as a generator during regenerative braking of the electric motorcycle 1, so that the generated alternating current is converted into a direct current by an inverter of the power control controller 60 and the batteries 50 are charged with the current. Control on the operation of the traveling motor 20 and control on charging and discharging of the batteries 50 are mainly performed according to operation of the accelerator grip 7 and/or a traveling state of the electric motorcycle 1 as well known.

Figure 3:
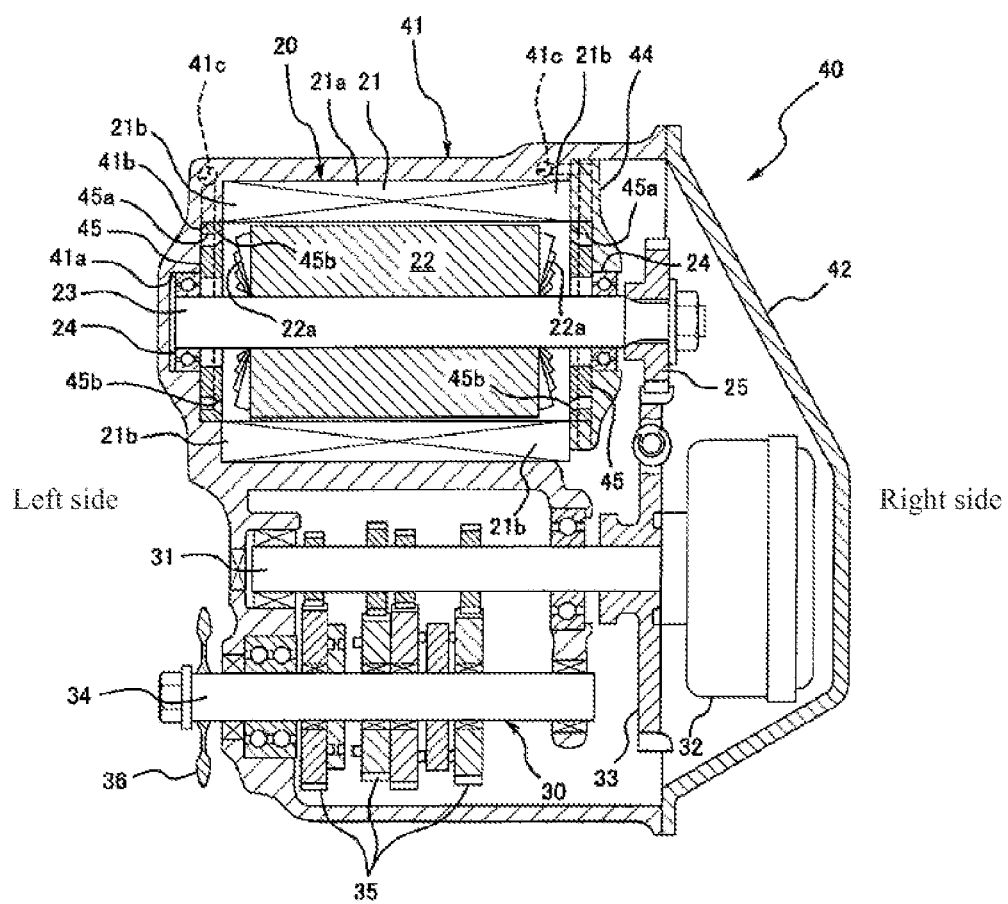
FIG. 3 is a developed view illustrating the structure of a power plant of the same electronic motorcycle.

FIG. 3 illustrates the structure of the power plant 40 of the electric motorcycle 1. A case of the power plant 40 which is illustrated is roughly an elliptical barrel with a closed bottom when viewed from the side, and includes an outer case 41 which is arranged such that a bottom of the outer case 41 faces leftward, and a cap 42 which is fastened in a manner of overlapping and closing the opening on the opposite side (the right side). As illustrated by an imaginary line in FIG. 5, an oil pan 43 which is tapered at the bottom is formed underneath the outer case 41 such that oil pan 43 bulges downward.

Returning back to FIG. 3, the traveling motor 20 includes a stator 21 fixed to the outer case 41, and a rotor 22 which revolves relative to the stator 21. In this example, the traveling motor 20 is configured by a so-called IPM motor in which a permanent magnet is embedded in an iron core of the rotor 22. Although not illustrated in detail, the stator 21 configures a typical structure in which a plurality of electromagnetic coils 21a is wound around the iron core (stator core) formed of an electromagnetic steel plate. The stator 21 is arranged so as to surround an outer circumference side of the rotor 22, and the outer circumference thereof is fixed to the outer case 41.

On the other hand, a motor shaft 23 made of steel passes through the rotor 22, and both ends of the motor shaft 23 in a longitudinal direction are supported on the outer case 41 via ball bearings 24, respectively. A left side ball bearing 24 is fitted in a circular recess 41a in the bottom of the outer case 41, and a right side ball bearing 24 is disposed in a barrier wall portion 44, which is a different form, fastened to the outer case 41. The motor shaft 23 passes through the barrier wall portion 44, and protrudes from the right side of the barrier wall portion 44. A leading end portion of the motor shaft 23 is provided with an output gear 25.

Figure 5:
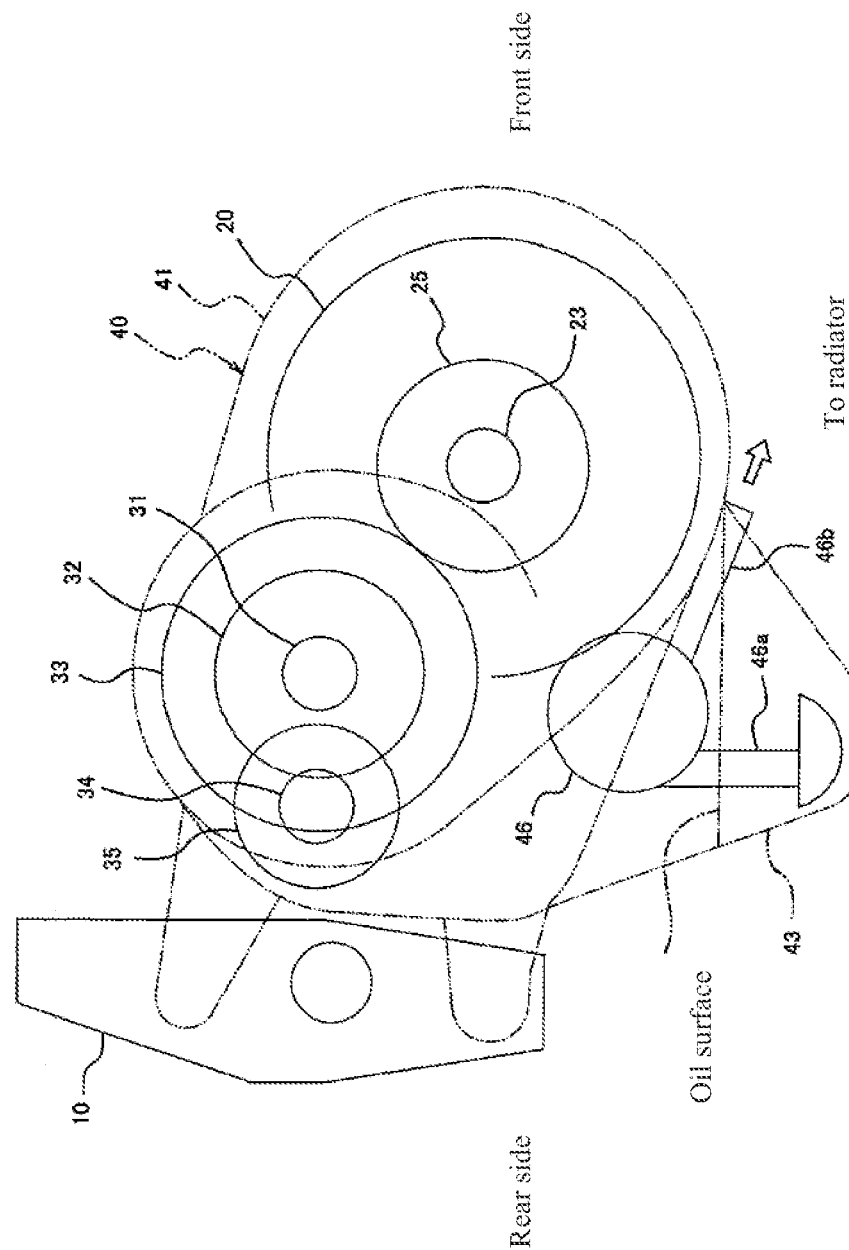
FIG. 5 is an explanatory view illustrating arrangement of main components in the power unit.

As illustrated also in FIG. 5, a clutch shaft 31 which is an input shaft of the transmission device 30 is disposed in the rear side of the traveling motor 20, a revolution output from the traveling motor 20 to transmission device 30 is switched so as to be input or intercepted by a multiplate clutch 32 disposed at a right end of the clutch shaft 31. Namely, a clutch gear 33 is externally and rotatably fitted near the right end of the clutch shaft 31, and meshes with an output gear 25 of the traveling motor 20. When this clutch gear 33 is connected to the clutch shaft 31 by the multiplate clutch 32, the clutch shaft 31 revolves in conjunction with the motor shaft 23.

In addition, an output shaft 34 of the transmission device 30 is disposed in parallel with the clutch shaft 31, and is connected via a gear train 35 so as to be speed-variable. A speed change ratio of the input and output revolutions, that is, a gear position of the transmission device 30 changes with a change in a combination of the gears connected to the gear train 35. a sprocket 36 is provided in a left end of the output shaft 34 which outputs the speed-changed revolution and, although not illustrated, a chain is wound around between the sprocket 36 and a sprocket of the rear wheel 3.

—Structure for Cooling Traveling Motor, Etc.—

In the present embodiment, in order to efficiently cool the traveling motor 20 and inverter, a non-conducting oil (coolant) comes directly in contact with the circuit board 60a of the inverter and the electromagnetic coil 21a of the stator 21. Namely, as illustrated in FIG. 3, in the traveling motor 20, the bottom of the outer case 41, facing an end surface of the left side of the rotor 22, and the barrier wall portion 44, facing an end surface of the right side of the rotor 22, are provided with ejection holes 45b so that the cooling oil can be ejected to be sprayed onto the coil end 21b of the stator 21 respectively.

Figure 4:
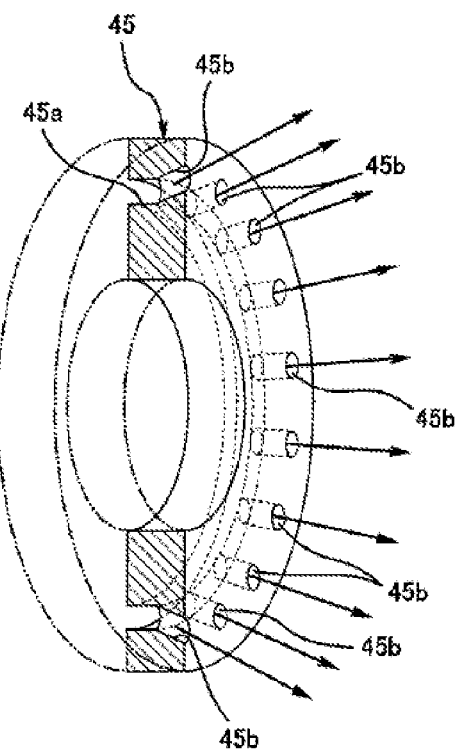
FIG. 4 is an explanatory view illustrating the structure of an ejection hole for cooling oil.

The ejection hole 45b illustrated on the left side in the drawing is described in detail, A relatively shallow large-diameter circular recess 41b which continuous to the outer circumference of the recess 41a into which the ball bearing 24 is fitted is formed in the bottom of the outer case 41. A disk-like member 45 (member in the case side) having a round hole at the center is fitted in the recess 41b. In the disk-like member 45 which is schematically illustrated in FIG. 4, a ring-shaped groove 45a is formed to be open at a position close to the outer circumference of a rear surface, thereby forming a ring-shaped oil path when the disk-like member 45 is fitted into the recess 41b of the outer case 41 as described above. This ring-shaped oil path communicates with an oil path 41c (which is partially illustrated in FIG. 3) which is formed in the outer case 41, thereby receiving the supplied cooling oil as described below.

And a plurality of holes 45b penetrating from the ring-shaped groove 45a to the front surface of the disc-like member 45, is provided at almost regular intervals in a circumferential direction of the ring-shaped groove 45a, in the example of the drawing, each of 18 holes 45b is obliquely formed to become gradually nearer the outer circumference side, from a position communicating the annular groove 45a towards the front surface of the disc-like member 45. As indicated by an arrow in the drawing, the oil is radially obliquely ejected outward (hereinafter, the holes 45b are referred to as cooling oil ejection holes 45b or simply ejection holes 45b).

In this example, the ejection holes 45b are provided to correspond to the plurality of coils 21a wound around the core of the stator 21, and the oil ejected from the ejection holes 45b is respectively sprayed to positions corresponding to the plurality of coils 21a of the stator 21 in the left side coil end 21b illustrated in FIG. 1 in the present embodiment, even in the barrier wall portion 44 on the right side in the drawing, the disc-like member 45 is assembled in a similar manner to the above-described way, and the ring-shaped groove 45a forms a ring-shaped oil path. The oil which is ejected from the ejection holes 45b communicating with the ring-shaped oil path is sprayed onto positions corresponding to the plurality of coils 21a of the stator 21 in regard to the right side coil end 21b.

As the oil ejected in this way from each of the plurality of ejection holes 45b is sprayed, the coil ends 21b of the stator 21 which are easy to rise to a high temperature can be effectively cooled. Since the thermal conductivity of the coil in the winding direction is generally high, the cooling efficiency of the coil 21a at a position corresponding to a cooling site of the coil end 21b also improves.

In addition, in the present embodiment, the traveling motor 20 is fixed to the outer case 41 in the outer circumference of the stator 21 as illustrated, so that the outer circumference side of the stator 21 radiates heat to the air via the outer case 41. However, it can be said that the heat is easily accumulated inside the inner circumference side. Then, the oil ejection holes 45b are provided to face the end surface of the rotor 22 which is disposed on the inner circumference side, so that the oil will be sprayed onto the inner circumference of the coil end 21b of the stator 21, which is disposed on the outer circumference side, from the oil ejection holes 45b.

In this way, by appropriately setting the orientation of the oil ejection holes 45b so as to aim at the coil ends 21b disposed on the outer circumference side, the oil can be sprayed onto the coil ends 21b as intended, and there is a little risk that the ejected oil invades the gap between the stator 21 and the rotor 22. In addition, since the ejection pressure of the oil is adjusted to full within in a suitable range by control of an oil pump 46 described below, the oil rebounding from the coil end 21b can be suppressed and there is a little risk that the oil, which has rebounded, invades the gap between the stator 21 and the rotor 22.

In addition, in the example of the drawing, a fin 22a is provided in the end surface of the rotor 22 so that air can be sent outward in the rotary axis direction due to rotation thereof (rightward when it is disposed in the right end surface, and leftward when it is disposed in the left end surface). Since the wind created in this way blows the oil, which drops from the upper side coil end 21b, such that the oil flies away from the rotor 22, invasion of the oil into the gap between the rotor 22 and the stator 21 can be prevented.

As described above, almost all of the oil which was sprayed to the coil end 21b to deprive of the heat flows downward along the windings extending in a circumferential direction of the coil end 21b and drops off the lower end portion of the coil end 21b, reaching the oil pan 43. As illustrated in FIG. 5, since the amount of oil stored in the oil pan 43 is set such that an oil surface is lower than the lowest portion of the stator 21, the windings of the coil 21a are not immersed in the oil. This is advantageous in terms of suppression of degradation of the covering.

On the other hand, the oil which is stored in the oil pan 43 is pumped up by the electric oil pump 46 and fed to an oil cooler 70. The oil pump 46 is driven, for example, by an electric motor to take in the oil from a strainer 46a and discharge the oil through a discharge port 46b. In this example, the discharge port 46b extends through the outer case 41, and is connected to an upstream end of a lower hose 71. As illustrated in FIG. 1, the lower hose 71 passes through a lower portion of the power plant 40, extends up to the front portion thereof, and is connected to a lower portion of the oil cooler 70 (heat exchanger) disposed in front of the batteries 50.

The oil cooler 70 extends from underneath the front end portion of the main frame 8 almost to the lower end of the down frame 9, and is disposed slightly ahead of the down frame 9. When the electric motorcycle 1 is viewed from the front side as illustrated in FIG. 2, the oil cooler 70 extends to be elongated in the vertical direction such that the oil cooler 70 is interposed between the left and right front forks 4, and a vertically elongated space S is provided between the left side and right side batteries 50 disposed behind the oil cooler 70 as illustrated by a dashed line.

Since the space S functions as a passage of a traveling wind which has passed by the oil cooler 70, the traveling wind can be not only smoothly introduced to the oil cooler 70 but also escape through the vertically elongated space S. Accordingly, cooling efficiency may be improved. And owing to the traveling wind, cooling of the batteries 50 is also achieved and the electric wire and power supply line which connects the connection terminals of the batteries are also effectively cooled. Furthermore, since the connection terminals and electric wire to which a high voltage is applied are located inside the body of a vehicle in a state of being interposed between the left and right batteries 50, this configuration is also advantageous in terms of securing safety.

In addition, the oil which is fed from the oil pump 46 to the lower portion of the oil cooler 70 as described above is cooled down by performing heat exchanging with the traveling wind while it is rising along the fluid path in the core of the oil cooler 70. The oil cooled in this way flows into an upper hose 72 connected to an upper portion of oil the cooler 70. In the example of the drawing, the upper hose 72 extends through the space formed between the left and right batteries 50 to further rear side, and a downstream end of the upper hose 72 is connected to the power control controller 60.

In the present embodiment, a case of the power control controller 60 has a flat rectangular box shape, and is disposed to incline downward towards the rear side, on the rear side of the space disposed above the power plant 40. The upper hose 72 is connected to the front side of the case. As illustrated by a dashed line in the drawing, a circuit board 60a of an inverter is accommodated in the case, a fluid path for the oil is formed to allow the cooling fin 60b joined to the circuit board 60a to be immersed in the oil. The oil which flows in this fluid path effectively cools the circuit board 60a.

A middle hose 73 for returning the oil to the power plant 40 is connected to the rear side of the case of the power control controller 60. The oil which has flowed through the inside of the middle hose 73 flows into the oil path 41c in the outer case 41 from an oil intake port provided in an upper portion of the outer case 41 of the power plant 40. Thus, the oil which has flowed through the inside of the oil path 41c is ejected from the ejection holes 45b as described above, and is sprayed onto the coil ends 21b of the stator 21 of the traveling motor 20.

That is, a circulation fluid path which circulates the oil between the power plant 40 and the power control controller 60, and the oil cooler 70 is constituted by the lower hose 71, the upper hose 72, and the middle hose 73. First, the oil cooled by the oil cooler 70 is first supplied to the power control controller 60 and is then supplied to the power plant 40 because an operation temperature of the traveling motor 20 is higher than an operation temperature of the inverter 60a.

Although not illustrated in the drawing, the oil path 41c in the outer case 41 is configured such that the oil may be supplied not only to the ball bearing 24 which supports the motor shaft 23 of the traveling motor 20, and bearings of the clutch shaft 31 and the output shaft 34, etc. of the transmission device 30 but also to the gear train 35. The oil is supplied for lubrication and cooling.

In addition, the oil pump 46 which feeds and circulates the oil in the way described above can change in its operation speed by control of the electric motor which drives it. For example, the operation speed increases and a discharge amount of the oil increases according to a current value supplied to the traveling motor 20 from the inverter, that is, as the current increases. When the control is performed like this, the ejection pressure of the oil ejected from the ejection holes 45b also becomes higher. However, the ejection pressure is excessively high, the amount of oil rebounding from the coil end 21b increases. Accordingly, the operation speed of the oil pump 46 is suppressed to be a upper limit or below.

The operation control of the oil pump 46 can be performed, for example, by the power control controller 60. That is, the power control controller 60 functions also as control device of the oil pump 60, which monitors a supply current from the inverter 60a and controls the current value supplied to the electric motor of the oil pump 46 according to the supply current from the inverter 60a.

As described above, in the electric motorcycle 1 according to the present embodiment, the oil is directly sprayed especially to the coil ends 21b of the stator which are especially easy to rise to a high temperature in the traveling motor 20 of the power plant 40, to draw heat from the coil ends 21b effectively. Furthermore, the oil which has risen in temperature by drawing the heat is circulated between the sprayed position and the oil cooler 70 so that the oil will exchange the heat with the. For this reason, although the structure is simplified, a very high cooling effect of the motor is acquired.

In addition, since the ejection amount and ejection pressure of the oil ejected from the oil ejection holes 45b are adjusted by operation control of the oil pump 46, an adequate amount of oil can be sprayed to the coil ends 21b as intended and the rebounding of the oil from the coil ends 21b can be suppressed. Therefore, there is a little risk that the oil invades the gap between the stator 21 and the rotor 22 and revolution resistance rapidly increases.

In addition, since the oil supplied from the oil cooler 70 is first introduced into the case of the power control controller 70 so as to be brought into direct contact with the cooling fin 60b joined to the circuit board 60a of the inverter accommodated in the case, before being supplied to the traveling motor 20, cooling of the inverter can be also very effectively performed.

Thus, since the oil which is circulated through the power plant 40, the power control controller 60, and the oil cooler 70 deprives of the heat by direct contact with the stator 21 and the inverter 60a as described above, other coolants such as LLC and the like are not necessary. For this reason, troubles such as increases in size and weight, and cost and complicated maintenance hardly occur.

Second Embodiment

Figure 6:
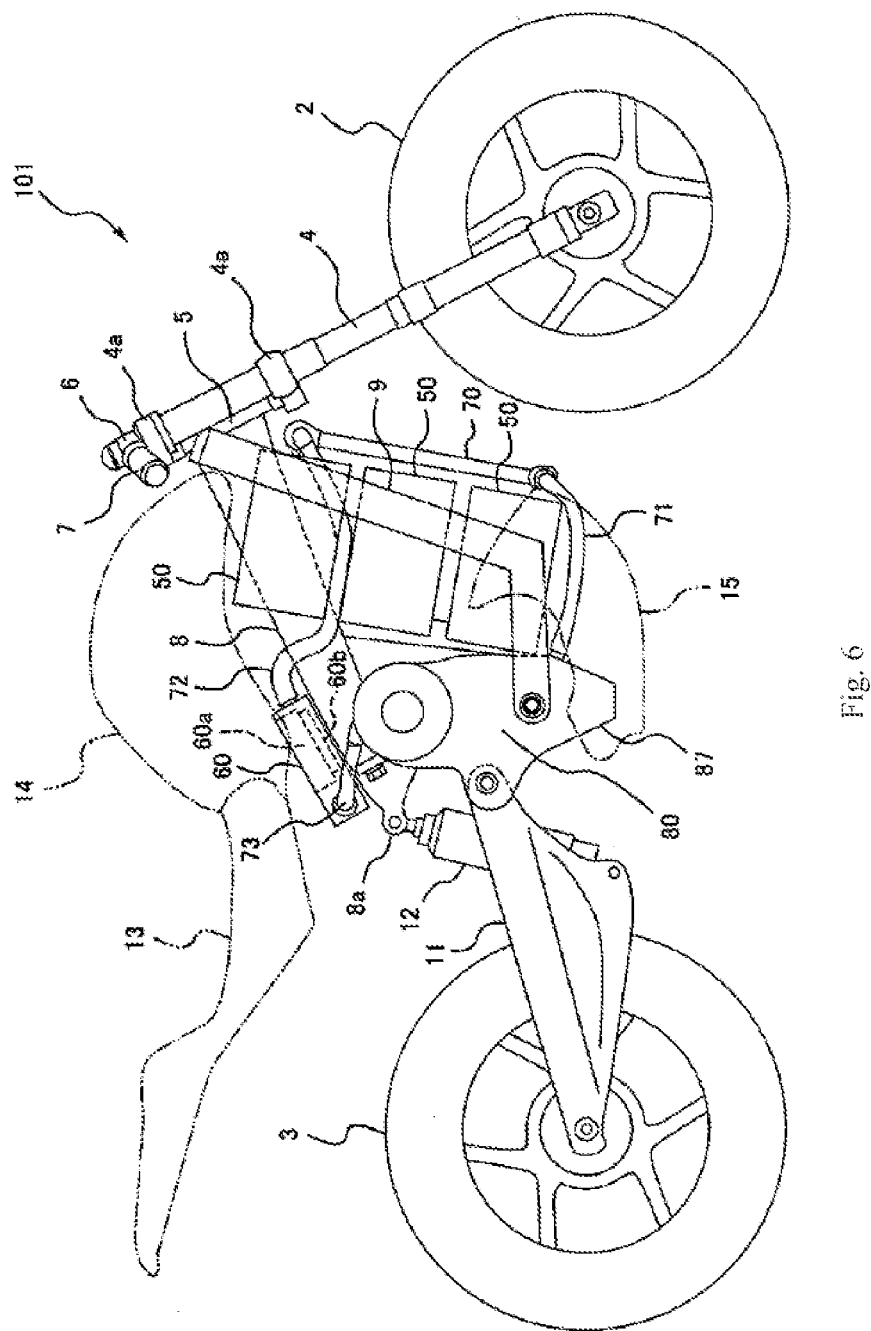
FIG. 6 is a view corresponding to FIG. 1 and illustrating a second embodiment.
Figure 7:
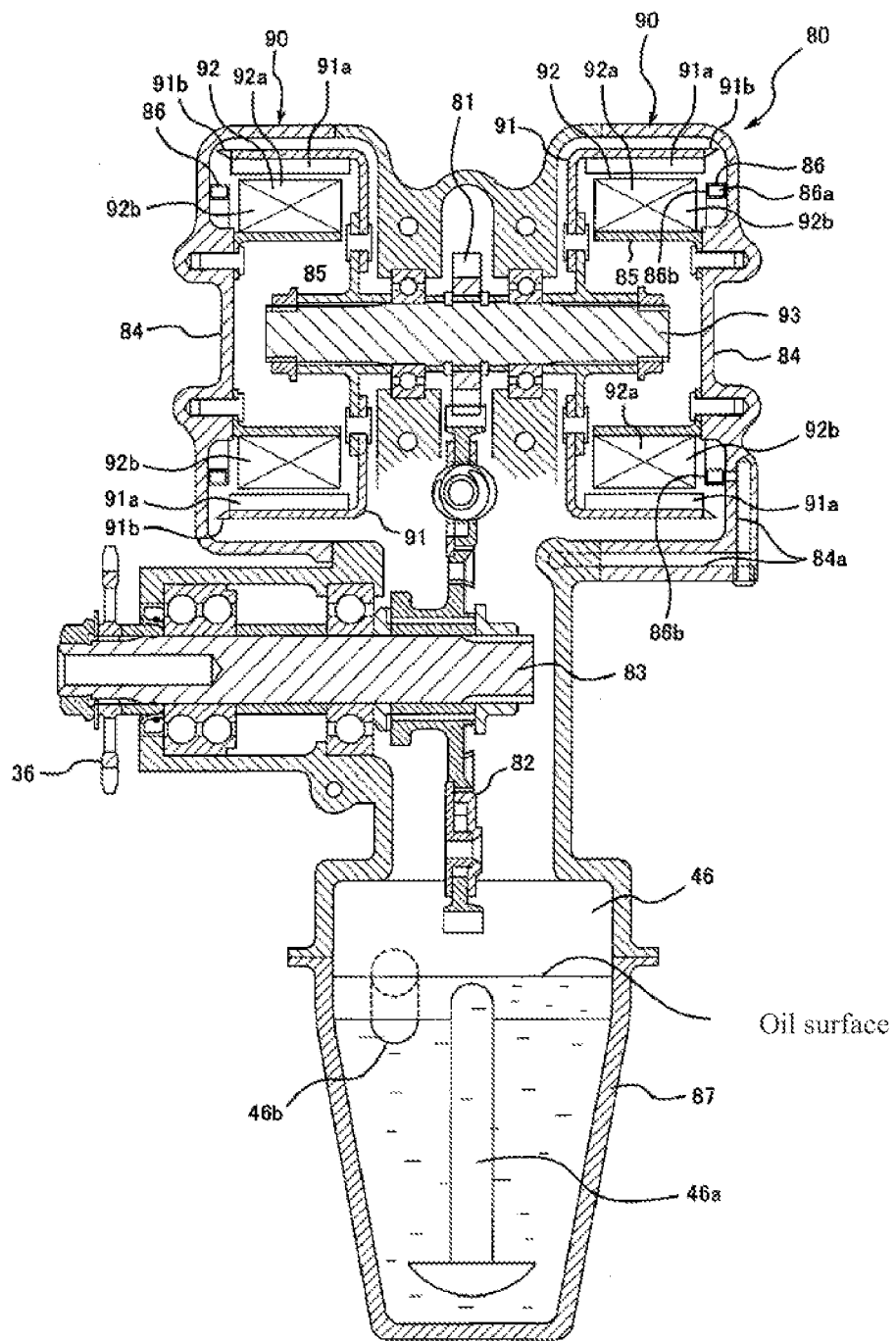
FIG. 7 is a view corresponding to FIG. 3.

FIGS. 6 and 7 illustrate an electric motorcycle 101 according to a second embodiment of the present invention. Both figures correspond to FIGS. 1 and 3 of the first embodiment, respectively. The electric motorcycle 101 of the second embodiment mainly differs in the structure of a power plant from the first embodiment and hence differs also in mounting positions of batteries 50 and a power control controller 60, but it does not differ in the other basic structure. Accordingly, corresponding members are denoted by the same reference signs throughout all the drawings, and a repetitive description will be avoided.

A power plant 80 of the second embodiment does not include a transmission device 30 so that the power plant 80 is very compact in a forward and rearward direction as illustrated in FIG. 6. For this reason, as illustrated in the drawing, down frames 9 extend rearward from a lower end, and a case of the power plant 80 is fastened to rear ends of the down frames 9. In addition, a pivot frame 10 is removed so that a swinging pivot (pivot shaft) of a swing arm 11 is provided in the case of the power plant 80 and an upper end portion of the case is fastened to a rear end portion of a main frame 8.

In addition, since there is a margin in a front space of the power plant 80, in the example of the drawing, six batteries 50 can be mounted, three on the left side and three on the right side. This margin is advantageous in increasing a traveling distance of the electric motorcycle 101. On the other hand, since the power plant 80 is slightly longer in a vertical direction, a power control controller 60 is displaced to above the main frame 8. Owing to this, arrangement and connection of an upper hose 72 and a middle hose 73 are changed. The upper hose 72 passes between the batteries 50 on the left and right sides, then passes through the right side of the main frame 8, and extends up to the power control controller 60. The middle hose 73 may be provided to also pass through the right side of the main frame 8.

As illustrated in FIG. 7, since a traveling motor 90 of the power plant 80 is configured such that a permanent magnet 91a is not embedded in but attached to a rotor 91, the traveling motor 90 is generally called an SPM motor. In the example of the drawing, two traveling motors, which have conventionally used as a generator of an motorcycle and the like, are used and share a motor shaft 93. A driving gear 81 is installed at a center of the motor shaft 93, and a driven gear 82 which meshes with the driving gear 81 is provided at an end portion of an output shaft 83 of the power plant 80.

That is, in the example of the drawing, the power plant 80 does not include the transmission device 30 provided in the first embodiment, and revolution of the motor shaft 93 is slowed down according to a gear ratio of the driving gear 81 and the driven gear 82, and is then transmitted to the output shaft 83.

In addition, arrangement in the traveling motor 90 is in reverse to that of the first embodiment. That is, a stator 92 is located in an inner circumference side and a rotor 91 is arranged to surround an outer circumference of the stator 92. For example, the traveling motor 90 illustrated on the right side in FIG. 7 will be described. The rotor 91 is a circular cylinder with a flat closed bottom. The cylinder is open at the right side and the motor shaft 93 passes through a center of the bottom, the left side, of the cylinder. The motor shaft 93 and the bottom of the rotor 91 are spline-fitted.

A plurality of permanent magnets 91a having a thin plate shape is arranged in a circumference direction in an inner circumferential surface of a circumferential wall of the rotor 91, and an iron core (core) of the stator 92 is arranged in proximity to the inner circumference side. A predetermined gap is formed between an outer circumferential surface of the stator core and an inner circumferential surface of the permanent magnet 91a of the rotor 91.

The stator 92 is attached via a cylindrical support member 85 to a case member 84 which constitutes a portion of a case of the power plant 80, and ejection holes 86b for cooling oil are provided in the case member 84 so as to face in proximity to the right end of the stator 92. That is, a circular ring-shaped member 86 is attached to the case member 84, thereby forming a circular ring-shaped oil path 86a. An oil path 84a in the case member 84 communicates with this oil path 86a so that the cooling oil can be supplied.

Figure 8:
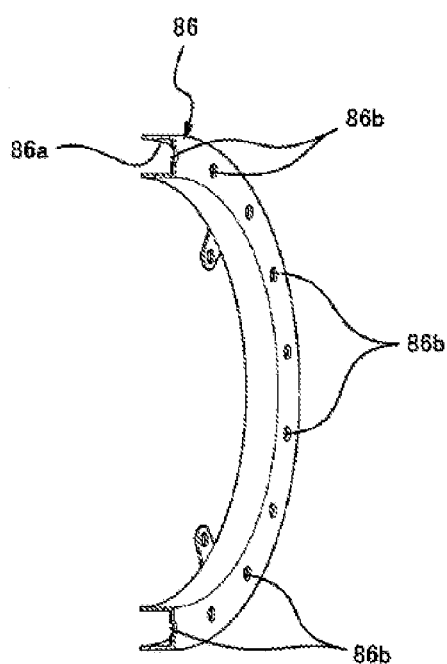
FIG. 8 is a view corresponding to FIG. 4.

As illustrated in an enlarged manner in FIG. 8, the circular ring-shaped member 86 has a C-shaped section, and a circular ring-shaped groove in the inside thereof serves as the oil path 86a. And a plurality of holes (ejection holes 86b) is provided in the circular ring-shaped member 86 at almost regular intervals in a circumference direction so as to communicate with the circular ring-shaped oil path 86a, and each hole is formed so as to eject the cooling oil toward a coil end 92b of the stator 92.

Although details are not illustrated, the plurality of ejection holes 86b are provided so as to correspond to a plurality of electromagnetic coils 92a wound around the core of the stator 92, respectively like the first embodiment, the oil ejected from each ejection hole 86b is sprayed onto a position corresponding to the electromagnetic coil 92a in the coil end 92b on the right side in the drawing. With this configuration, the coil end 92b of the stator 92 and furthermore the coils 92a can be effectively cooled.

In this way, a portion of the oil which has deprived the coil end 92b of the heat in this way flows downward from the support member 85 of the stator 92, along an inner surface of the case member 84, and reaches an oil pan 87 located under the case, in addition, a portion of the oil flows downward along windings of the coil end 92b, and then drops off a lower end portion of the coil end to the oil pan 87 disposed under the coil end. A portion of the oil which is falling in this way is in contact with the rotor 91 but it is blown by a centrifugal force of the rotor 91 which rotates at high speed. Therefore, there is a little risk of the oil invading the gap between the rotor and the stator 92.

Furthermore, in the example of the drawing, since a fin 91b is provided in an end portion of the rotor 91, a wind traveling away from the rotor 91 is created due to rotation of the fin 91b. Accordingly, the oil is blown away by the wind. In the example of the drawing, an oil surface of the oil stored in the oil pan 87 is set to be lower than the lowest portion of the driven gear 82 so that agitation resistance may not be generated.

Although not illustrated, the rotor 91 is reduced in size in a rotary axis direction, and a right end is displaced to the left side. And, a portion which protrudes outward from a right end surface of the rotor 91 may be provided in proximity to a lower end portion of the coil end 92b of the stator 92. With this configuration, the oil which drops off the lower end portion of the coil end 92b hardly reaches the rotor 91. Accordingly, this configuration is advantageous in preventing the oil from invading the gap between the rotor and the stator 92.

Other Embodiment

Description of the aforementioned embodiments is merely exemplification, and does not limit the present invention, application or use thereof. For example, in the first embodiment, the ejection holes 45b for cooling oil are provided on both of the left and right sides of the rotor 22 of the traveling motor 20, and the oil is sprayed onto both of the coil ends 21b on the left and right sides of the stator 21, respectively. However, the configuration is not limited to this. For example, the oil may be sprayed onto only either one coil end like in the second embodiment.

In addition, in each of the embodiments described above, the oil pump 46 for feeding cooling oil is accommodated in the case of the power plant 40 or 80 and configured to pump out the oil stored in the oil pan 46 or 87. However, the present invention is not limited to this. An oil pump 46 may be disposed near an oil cooler 70.

However, when the oil pump 46 is accommodated in the case of the power plant 40 or 80, a mechanical pump may be connected so as to be driven by a motor shaft 23 or 92 of a traveling motor 20 or 90. With this configuration, since a discharge amount of the oil by a pump increases as revolution of the traveling motor 20 or 90 becomes faster, cooling which is adaptively performed according to a temperature state of the traveling motor 20 or 90 can be achieved as a result.

Furthermore, although both of the traveling motor 20 or 90 and the power control controller 60 are cooled by the oil in each of the embodiments described above, only either one of them may be cooled. For example, in regard to the power control controller 60, a cooling fin 60b joined to a circuit board 60a of an inverter may not be immersed in the oil, but the circuit board 60a may be cooled by a cooler in which oil flows.

Figure 9:
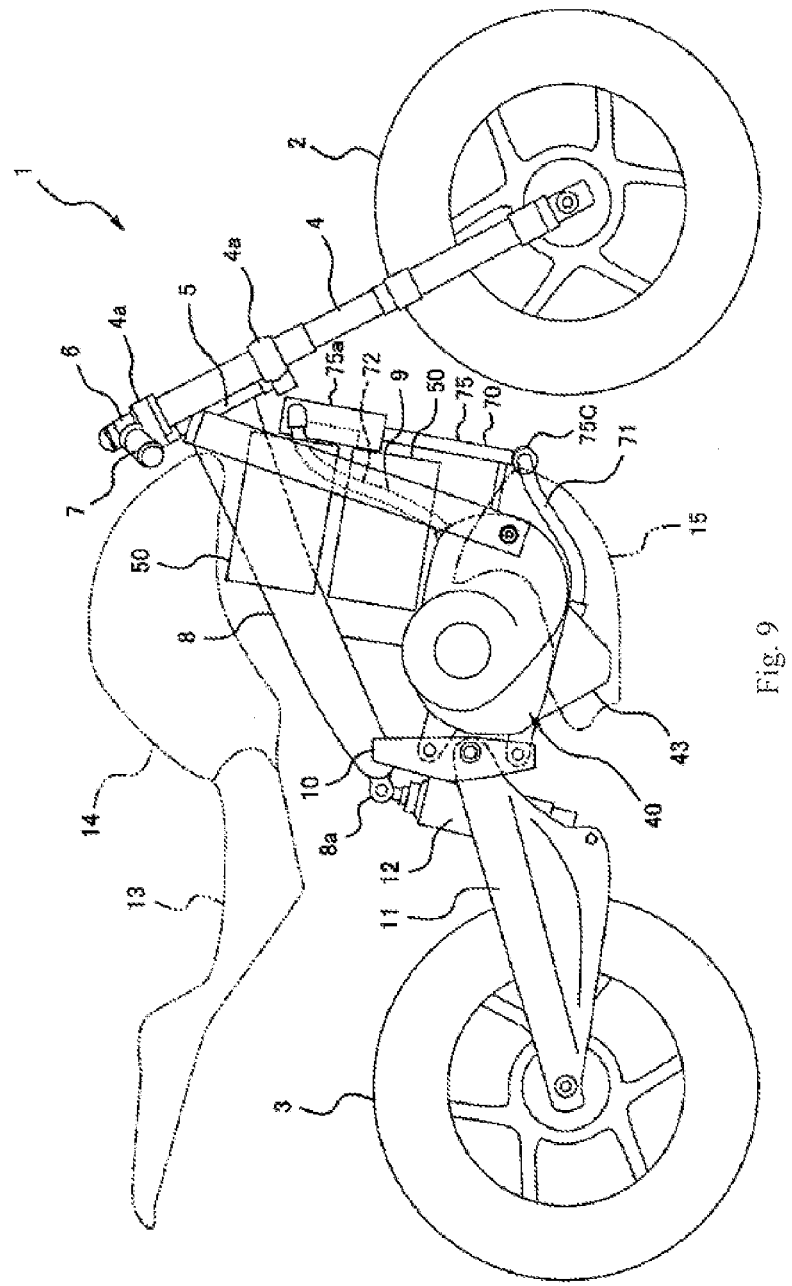
FIG. 9 is a view corresponding to FIG. 1 and illustrating another embodiment in which an inverter and an oil cooler are integrated with each other.
Figure 10A:
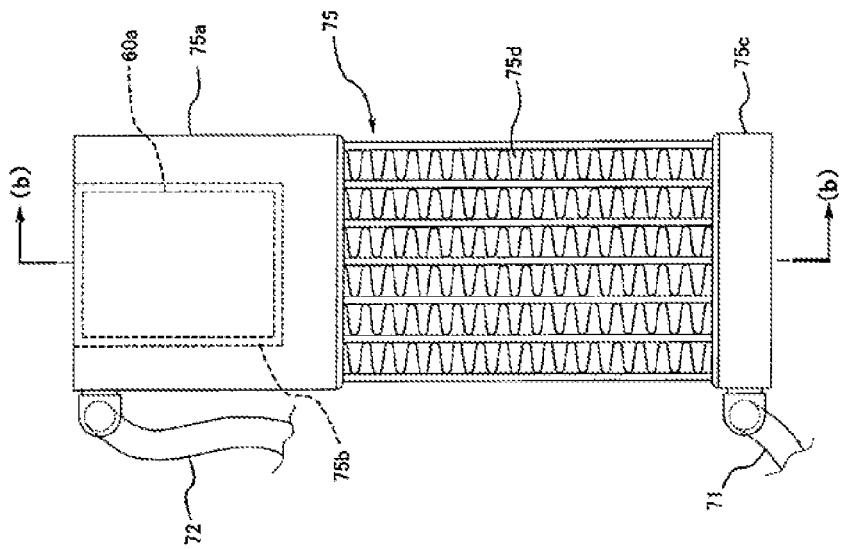
FIGS. 10($a$) and 10($b$) are explanatory diagrams schematically illustrating the structure of the oil cooler, in which FIG. 10($a$) is a front view and FIG. 10($b$) is a cross-sectional view viewed from the right side.
Figure 10B:
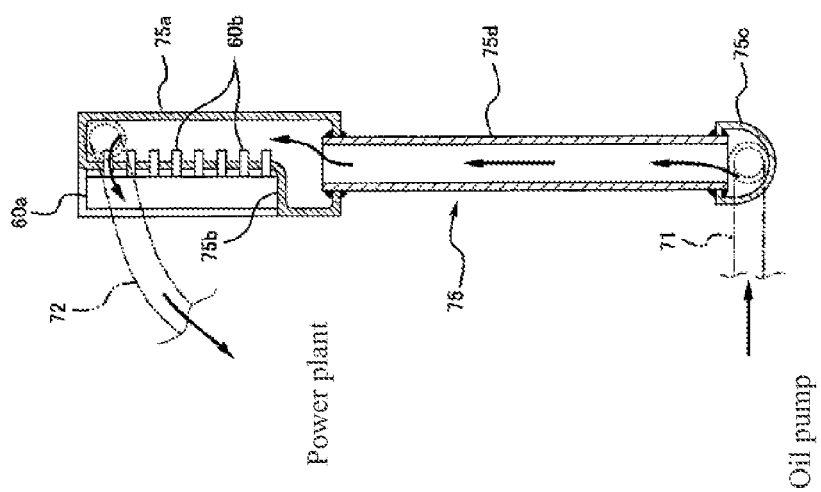

Yet furthermore, the circuit board 60a of the inverter may be integrally formed with an oil cooler. For example, as illustrated in FIGS. 9 and 10, the oil cooler 75 has a recess 75b which is open at the rear side, forming a flat U shape when viewed from above, and an upper tank 75a of the oil cooler 75 may be large as compared with that of the first embodiment. And the circuit board 60a of the inverter is mounted to be fitted in the recess 75b. A cooling fin 60b is joined to a front surface of the circuit board 60a like in the first embodiment, and this passes through a wall surface of the recess 75b of the upper tank 75a and is immersed in the oil stored in a tank.

According to this configuration, the oil which is fed from the oil pump 46 of the power plant 40 and introduced into a lower tank 75c of the oil cooler 75 is cooled by heat exchange with a traveling wind while the oil is rising along the fluid path in the core 75d of the oil cooler 75. Thus, the oil effectively cools the circuit board 60a of the inverter in the upper tank 75a of the oil cooler 75, and then flows into an upper hose 72 connected to the upper tank 75a.

In addition, although a description is made about the electric motorcycles 1 and 101 in the embodiments, the electric vehicle according to the present invention is not limited to the motorcycles, and for example, it may be an ATV (All Terrain Vehicle), a mechanical mule, and the like.

INDUSTRIAL APPLICABILITY

As described above, since the cooling structure for an electric vehicle according to the present invention can obtain an increased cooling efficiency as compared with a conventional art, and has a simple structure which hardly causes increases in size, weight, and cost, it is especially useful for an electric motorcycle.

DESCRIPTION OF REFERENCE SIGNS

1: Electric motorcycle (electric vehicle)
2: Front wheel
4: Front fork
20, 90: Traveling motor (electric motor for traveling)
21, 92: Stator
21a, 92a: Electromagnetic coil
21b, 92b: Coil end
22, 91: Rotor
30, 81, 82: Transmission device gear-type driving-force transmission mechanism)
40, 80: Power plant
41: Outer case (case of an electric motor)
45: Disk-like member (member of case side)
45b, 86b: Ejection hole for cooling oil (coolant supplier)
46: Electric pump (coolant supplier)
60: Power control controller (controller)
60a: Circuit board of inverter (power supply circuit)
70: Oil cooler (heat exchanger)
71: Lower hose (circulation fluid path)
72: Upper hose (circulation fluid path)
73: Middle hose (circulation fluid path)

The invention claimed is:

1. A cooling structure for an electric vehicle including an electric motor for traveling and a power supply circuit for supplying electric power to the electric motor, the cooling structure comprising:
   a coolant supplier that supplies a non-conducting coolant such that the non-conducting coolant comes into direct contact with at least one of an electromagnetic coil of the electric motor and a substrate of a power supply circuit;
   a heat exchanger that is disposed outside cases of the electric motor and the power supply circuit, and is disposed so as to allow a traveling wind to pass through the heat exchanger; and
   a circulation fluid path which circulates the coolant between the case of at least one of the electric motor and the power supply circuit, and the heat exchanger.

2. The cooling structure according to claim 1, wherein the coolant supplier is configured to eject the coolant toward the electromagnetic coil of a stator fixed to the case of the electric motor.

3. The cooling structure according to claim 1, wherein the coolant supplier includes an electric pump that is variable in operation speed.

4. The cooling structure according to claim 3, further comprising a controller that controls the electric pump according to at least an operation state of the electric motor.

5. The cooling structure according to claim 1, wherein the coolant supplier includes a mechanical pump mechanically connected to the electric motor.

6. The cooling structure according to claim 1, wherein a gear-type driving-force transmission mechanism transmitting a torque of the electric motor is also accommodated in the case of the electric motor, and the coolant is used for lubrication of the driving-force transmission mechanism.

7. The cooling structure according to claim 1, wherein the coolant supplier includes a fluid path for the coolant, the fluid path being configured such that at least a portion of a circuit board accommodated in the case of the power supply circuit is immersed in the coolant.

8. The cooling structure according to claim 7, wherein the portion of the circuit board immersed in the coolant is a cooling fin provided at the circuit board.

9. The cooling structure according to claim 7, wherein the case of the power supply circuit is disposed in the circulation fluid path for the coolant such that the case of the power supply circuit receives the coolant from the heat exchanger, and the case of the electric motor is disposed in the circulation fluid path for the coolant such that the case of the electric motor receives the coolant from the case of the power supply circuit.

10. The cooling structure according to claim 1, wherein the vehicle is an electric motorcycle, the heat exchanger is disposed behind a pair of front forks that support a front wheel and elongated in a vertical direction so as to be interposed between the pair of front forks when viewed from the front of a body of the vehicle, a plurality of batteries is divided and separately disposed on left and right sides behind the heat exchanger, and a traveling wind passage is formed between the left side and right side batteries so as to extend in the vertical direction when viewed from a front side of the vehicle body.

11. The cooling structure according to claim 10, wherein an electric wire that connects connection terminals of the batteries is disposed to be exposed to the traveling wind passage.

\* \* \* \* \*